United States Patent [19]

Hofmeister

[11] 4,021,797

[45] May 3, 1977

[54] AUDIO FREQUENCY POWER LINE CONTROL SYSTEM

[75] Inventor: Helmut Hofmeister, Rottenbach, Germany

[73] Assignee: Siemens Aktiengesellschaft, Munich, Germany

[22] Filed: Nov. 20, 1975

[21] Appl. No.: 633,794

[30] Foreign Application Priority Data

Nov. 28, 1974 Germany .......................... 2456344

[52] U.S. Cl. ............................. 340/310 A; 321/34
[51] Int. Cl.² ....................................... H04M 11/04
[58] Field of Search ................... 340/310 A, 310 R

[56] References Cited

UNITED STATES PATENTS

| | | | |
|---|---|---|---|
| 3,439,338 | 4/1969 | Perry | 340/310 R |
| 3,925,763 | 12/1975 | Wadhwani | 340/310 A |
| 3,942,168 | 3/1976 | Whyte | 340/310 R |

FOREIGN PATENTS OR APPLICATIONS 251,063   8/1969   U.S.S.R. ....................... 340/310 A

*Primary Examiner*—Thomas B. Habecker
*Attorney, Agent, or Firm*—Kenyon & Kenyon Reilly Carr & Chapin

[57] ABSTRACT

An audio frequency power line carrier control system utilizing an inverter as the carrier control transmitter with the output phase voltages of the inverter fed to a distribution network through a series inductance, a filter circuit and a current transformer in which a starting control is provided which modulates the audio frequency pulses at the beginning of clock pulses for transmitting data using a control signal which is pulse width modulated, modulation being terminated when the pulse width of the control pulse width falls below a predetermined minimum duration thereby permitting small series inductances to be used.

7 Claims, 9 Drawing Figures

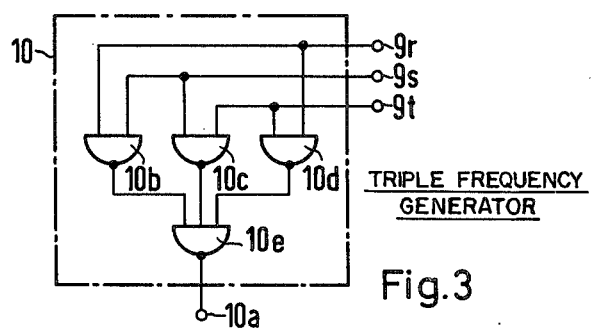
Fig.3 TRIPLE FREQUENCY GENERATOR
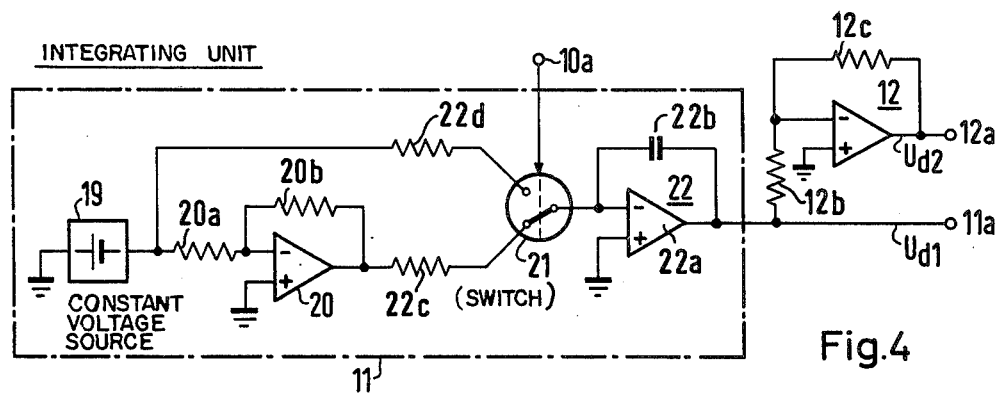
Fig.4
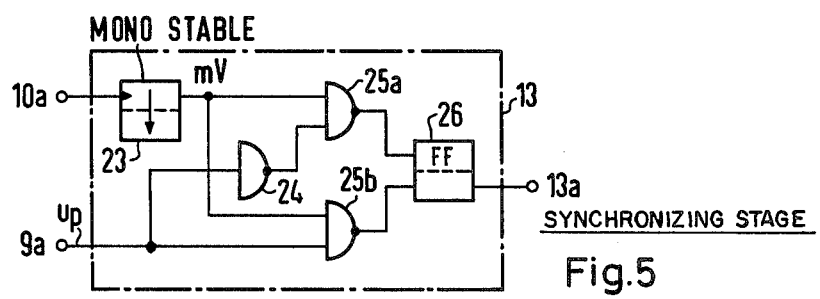
Fig.5 SYNCHRONIZING STAGE
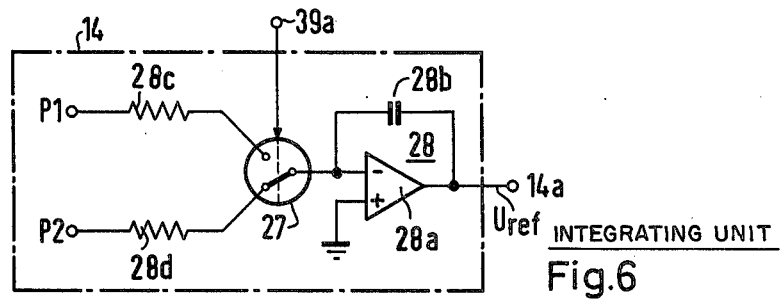
Fig.6 INTEGRATING UNIT

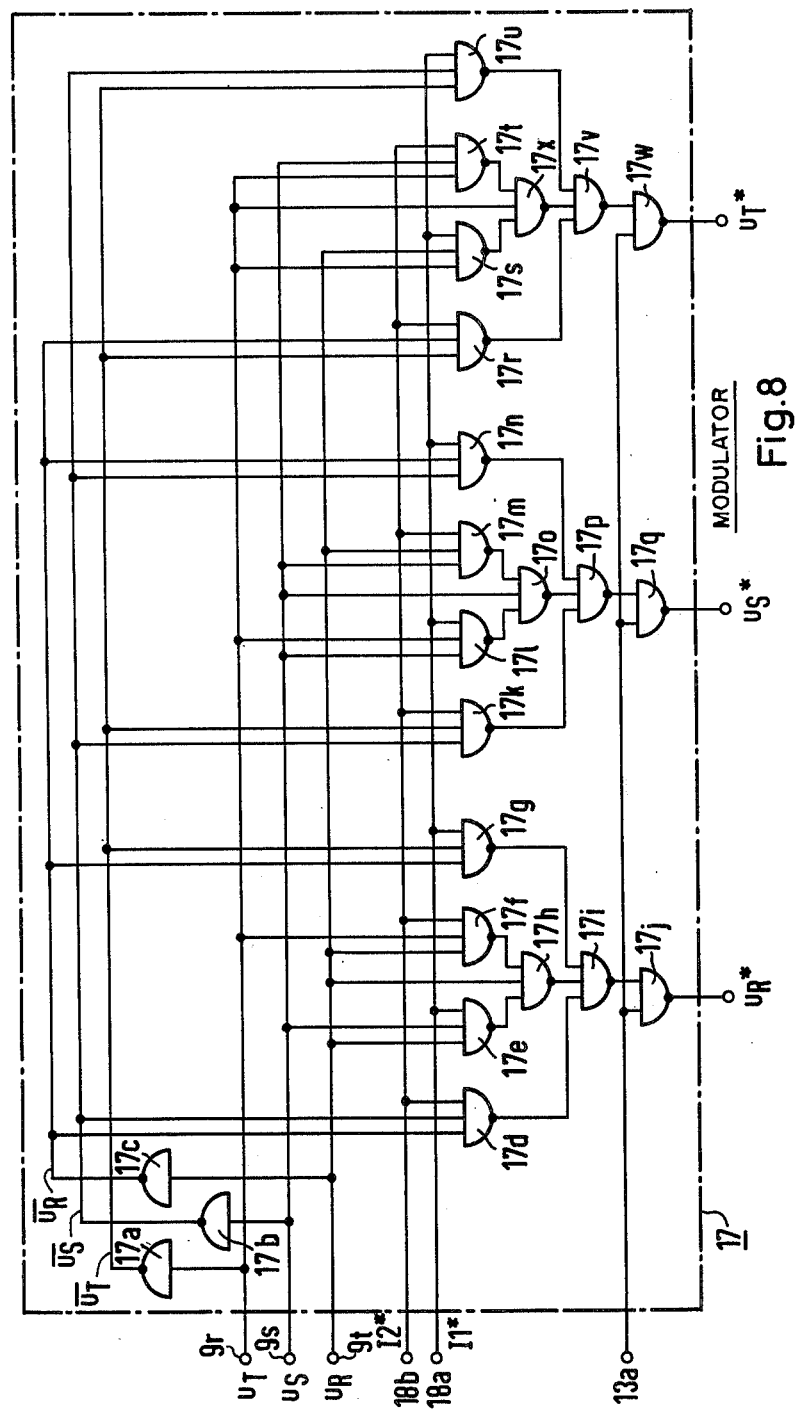

AUDIO FREQUENCY POWER LINE CONTROL SYSTEM

BACKGROUND OF THE INVENTION

This invention relates to audio frequency power line carrier control systems in general and more particularly to such a system utilizing an inverter in which modulation of the inverter output is accomplished during start-up to allow using smaller series inductances.

Power line carrier control systems permit coded information to be transmitted through a three-phase or a single phase network. Low frequency waves in the frequency range between 150 and 500 Hz. are used for this purpose. These pulse trains are transmitted for a duration of time determined by a clock pulse. Receivers coupled to the distribution network are tuned to the respective audio frequency and decode the transmitted information. Information can be used, for example, to initiate switching operations in distribution networks, for switching a consumers meter to a different rate, e.g., night rate, or to notify a particular group of persons such as the fire department.

Audio frequency power line control systems utilizing inverters as the power line control transmitter with the output phase voltages fed into a distribution network through a series inductance, a filter circuit and a current transformer are known. However, in these devices the design of the series inductance is a problem. Ideally, this inductance should be as small as possible so that it will bring about good attenuation of the harmonics in the output voltage of the inverter and cause no excessive voltage under load. On the other hand, the series inductance must be made as large as possible in the known audio frequency power line control systems using inverters since the rate of rise of the inrush current upon starting up at the switching on of each clock pulse must be limited. This inrush current occurring during switching is caused by the charging of the capacitors in the filter circuit with a possible contribution due to the fact that a low impedence network is being fed. This inrush current leads to a transient with very high current peaks which the inverter must be designed to withstand.

In view of these difficulties, the need for a new means of operating an audio frequency power line control system of this nature which limits the inrush current without using an extremely large series inductance becomes evident.

SUMMARY OF THE INVENTION

The present invention solves this problem by modulating the audio frequency pulses at the beginning of the clock pulse using synchronized, pulse with modulated control pulses. In accordance with the present invention, the inrush current is limited by modulation of the output voltage. As a result, the series inductance need no longer be designed with a view to limiting the rate of rise of current. Instead the design of this inductance can be directed to adequate attenuation of the harmonics and a small voltage drop under load.

Apparatus for implementing such a control according to the present invention includes a starting control having a first generator unit for forming two symmetrical triangular voltages with opposite phase and a frequency three times the audio frequency. These are synchronized with the audio frequency pulses. Also included is a second generator for forming a reference voltage changing linearly with time. These generated voltages are fed to a pair of comparators which form pulses by comparing the respective triangular voltages with the reference voltage. The outputs of the comparators are provided to a modulator which forms the control pulses from the audio frequency pulses and the pulses out of the comparators.

BRIEF DESCRIPTION OF THE DRAWINGS

FIG. 3 is a logic diagram illustrating a generator which may be used for generating the triple audio frequency.

FIG. 4 is a circuit diagram illustrating an integrating unit for forming symmetrical triangular voltages.

FIG. 5 is a similar diagram of a synchronizing means.

FIG. 6 is a circuit diagram of an integrating unit for forming the reference voltage.

FIG. 8 is a logic diagram showing the manner in which the modulator is implemented.

DETAILED DESCRIPTION OF THE PREFERRED EMBODIMENT

Figure 1:
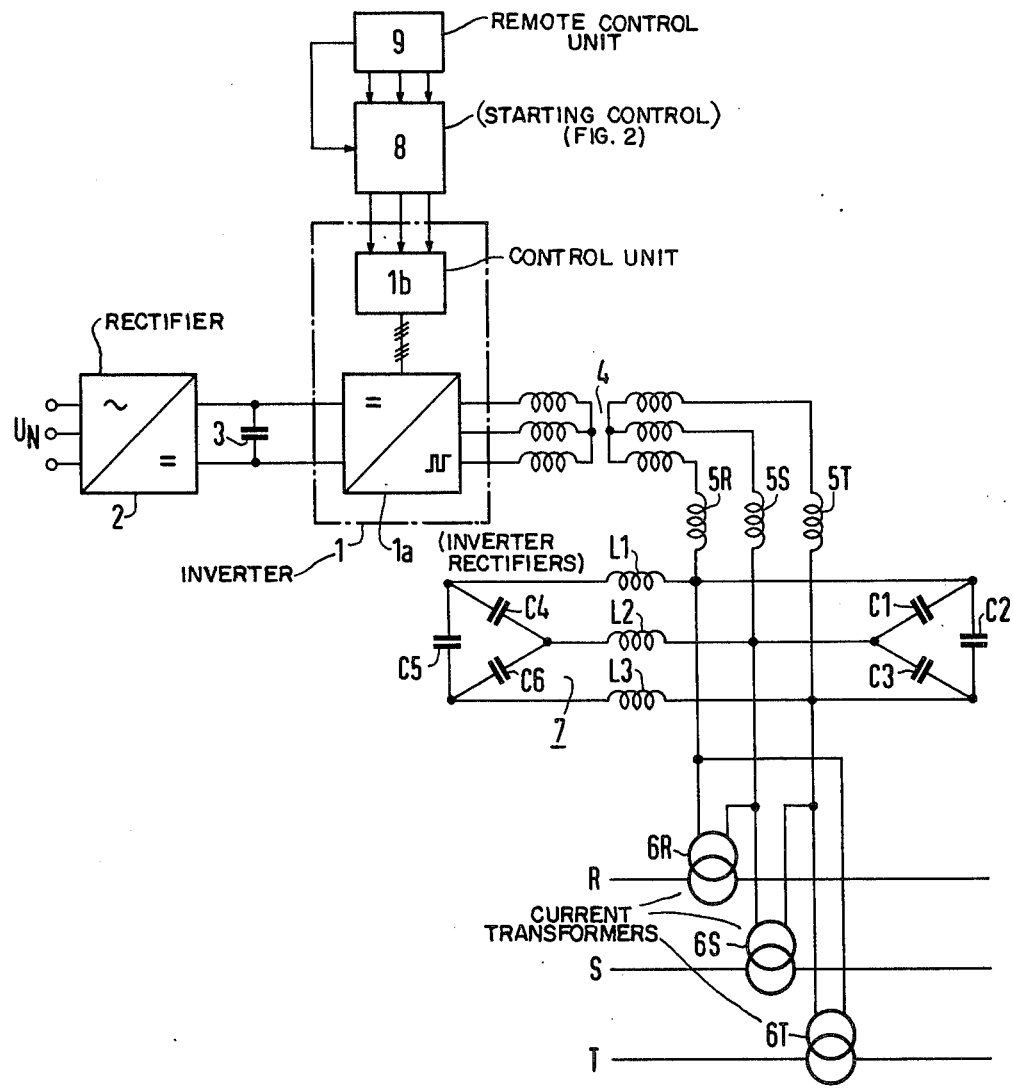
FIG. 1 is a basic block diagram of an audio frequency power line carrier control system having the starting control of the present invention.

FIG. 1 is a basic block diagram of the system according to the present invention. In this arrangement, an inverter 1 is used as a power line carrier control transmitter. Its DC input is coupled to the output of a rectifier 2 obtaining an AC input voltage $U_N$ from the line. This is an arrangement in which, in the intermediate link between the rectifier and converter, a constant voltage is impressed. An intermediate link capacitor 3 is coupled across the intermediate link between the rectifier and inverter.

Inverter 1 forms output phase voltages of square waveform, preferably in the audio frequency range between 150 and 500 Hz. These three-phase voltages are coupled through a three-phase transformer 4, through series inductances 5R, 5S and 5T, a filter circuit 7 and current transformers 6R, 6S and 6T to the three phases R, S and T of the distribution network. The filter circuit 7 is a three-phase filter including two sets of three-capacitors C1, C2 and C3 and C4, C5 and C6 coupled in delta fashion with the junction points of the two capacitor groups coupled together through inductances L1 and L2 and L3. The junction points of the group of capacitors C1, C2 and C3 and the inductors L1, L2 and L3 are coupled to the junction between the inductors 5R, 5S and 5T and the current transformers 6R, 6S and 6T. This is a conventional arrangement. The filter circuit 7 is tuned so it theoretically has infinite impedence for the audio frequency thereby permitting the audio frequency power to be fed into the distribution network through the current transformers with a minimum of loss. The circuits of the capacitors and inductances arranged between the individual phases are designed to present a minimum impedence to line frequency so as to present a load with an impedence as low as possible to the current transformers, 6R, 6S and 6T.

The series inductances 5R, 5S and 5T filter the output voltage of the inverter 1 so that audio frequency current with a waveform which is as far as possible sinusoidal is fed to the distribution network phases R, S, and T. These series inductances are made as small as possible so that good attenuation of harmonics in the output voltage of the inverter is still obtained with no excessive voltage drop under load. However, in order that no excessive inrush currents occur because of the small size of the series inductances, in accordance with the present invention a starting control 8 is utilized. As illustrated on the figure, the starting control 8 is placed between a remote control unit 9 and the control unit 1b of the inverter. This starting control 8 permits using a pulse modulation method which will cause the inverter output, over a predetermined time starting from the beginning of a clock pulse, to have an RMS value which starts out small and gradually increases. Because of this gradual increase it is not necessary to overdesign the inverter for the inrush current.

The details of this starting control will now be described. In conjunction therewith, reference may be had to FIG. 9 which illustrates pulses at various portions of the system.

Figure 2:
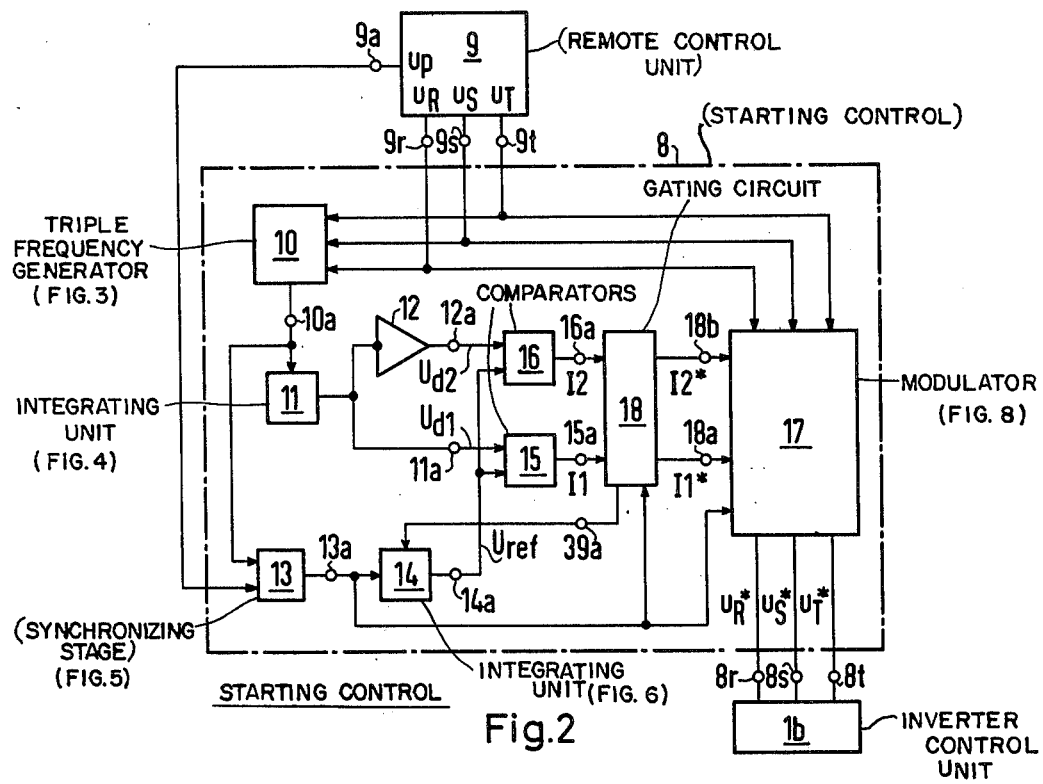
FIG. 2 is a block diagram of the starting control of FIG. 1.

A block diagram of the starting control is shown on FIG. 2. The remote control unit 9, of conventional design, provides, at its output 9a, clock pulses which determine the duration of the transmission (in other words these are gating pulses which start and stop the transmission of audio frequency signals.) The clock pulses are designated $\mu_p$ and a typical clock pulse is shown on FIG. 9. The unit 9 also outputs at terminals 9r, 9s and 9t audio frequency pulses $\mu_R$, $\mu_S$ and $\mu_T$. As shown, on FIG. 9 these are pulses at the same frequency but displaced in phase. Their frequency is the basic audio frequency which is being transmitted. Normally, such pulses would be used directly to control the control unit 1b of the inverter 1. However, in accordance with the present invention, these pulses are modulated in a modulator 17 during start up. The modulated pulses $\mu R^*$, $\mu_S^*$ and $\mu_T^*$ are then fed to the input terminals 8r, 8s and 8t of the control unit 1b. To accomplish this modulation there is provided a triple frequency generator 10 having as inputs the outputs from the terminals 9r, 9s and 9t of the remote control unit 9. In a manner to be described below it converts these pulses into a pulse train having a frequency three times that of audio frequency. This triple frequency output at the terminal 10a is provided to an integrating unit 11 having associated therewith an inverting amplifier 12. As a result at the terminals 11a and 12a there will be voltages $U_{d1}$ and $U_{d2}$ which are triangular in nature and have a frequency three times that of the audio frequency. Furthermore, because of the nature in which they are derived they are synchronized with the audio frequency. The clock pulse output from terminal 9a along with a triple frequency output is also provided to a synchronizing stage 13 which provides its output at terminal 13a to a further integrating unit 14 which generates a reference voltage $U_{ref}$ linearly variable in time and provides it as an output at terminal 14a. The reference voltage along with the two triangular voltages are provided to comparators 15 and 16 providing respective outputs designating 11 and 12 at the terminals 15a and 16a. These outputs, which will be pulses, are the inputs to gating circuit 18 which derives therefrom outputs 11* and 12* at the terminals 18a and 18b. These pulse outputs form the inputs to the modulator 17 for modulating the audio frequency from the remote control unit 9.

FIG. 3 illustrates the triple frequency generator 10 in more detail. As illustrated, it is simply an arrangement of four Nand gates 10b through 10e. As is well known in the art, a Nand gate will have a high or logical 1 output only when all its inputs are zero. These gates are commonly used in digital circuits. A Nand gate is recognized by the symbol for an And gate with a dot at its output indicating an inversion. In other words it is an And gate with an inverted output. The manner in which the triple frequency is formed in this arrangement can best be seen by examining the first four waveforms on FIG. 9. A combination of the pulses in the manner illustrated, in which pairs of the pulses $U_R$, $U_S$ and $U_T$ are provided to the Nand gates 10b, c and d with the outputs of those Nand gates provided as three inputs to the Nand gate 10e, results in this triple frequency as can be seen from examination of FIG. 9. With the inversions carried out by a Nand gate the circuit amounts to Anding the three inputs in pairs and then Oring the outputs of those gates.

Figure 9:
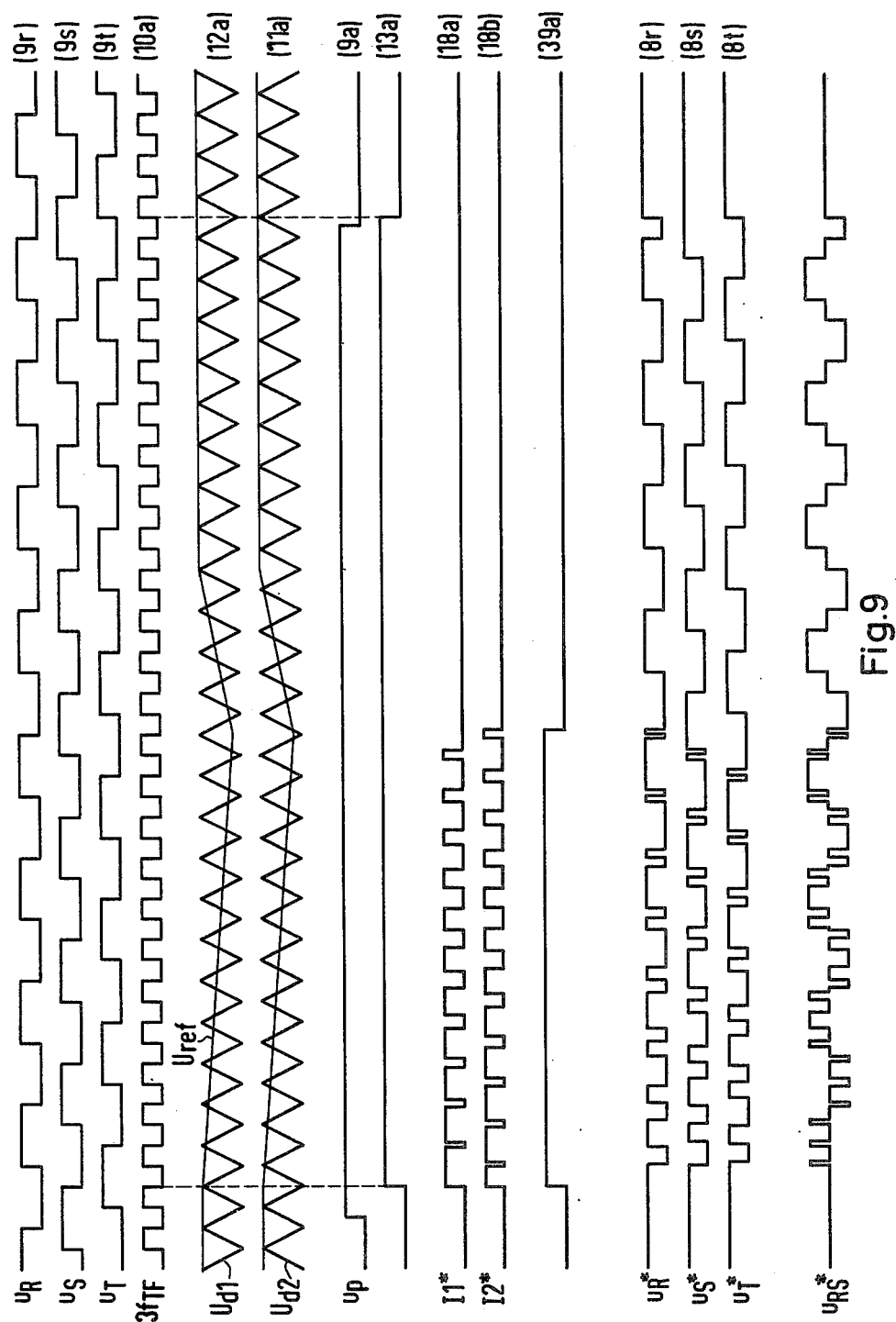
FIG. 9 is a waveform diagram illustrating the time relationship between the various waveforms developed in the apparatus disclosed in connection with the previous figures.

FIG. 4 illustrates the design of the integrating unit 11 and its associated amplifier 12 which generates the triangular waveforms. These are the waveforms $U_{d1}$ and $U_{d2}$ which, as shown by FIG. 9, are symmetrical, complementary triangular waveforms having a frequency three times that of the audio frequency. The integrating unit 11 includes a constant voltage source which is coupled to an amplifier 20 through an input resistor 20a. Amplifier 20 has a feedback resistor 20b coupling its output to its inverting input. Its purpose is inversion and thus the two resistors will be of equal value to obtain a unity gain inverting amplifier. The inverted input is thus coupled through a resistor 22a and a switch 21 to an integrator 22 made up of an operational amplifier 22c with a capacitor 22b in its feedback path; the non-inverted, constant voltage from the source 19 is coupled through resistor 22d and the switch 21 to the integrator 22. The input to the switch is coupled to the terminal 10a at which the triple frequency occurs. Reference to FIG. 9 will show that the triple frequency pulses have an on time and an off time which is equal. When the pulse is at 1 level the switch will be in the position shown coupling the negative voltage to the integrator and, when the pulse changes state, the switch will switch to the position not shown to couple the direct input into the integrator. This will result in the integrator integrating up and down for equal time periods to provide the desired symmetric triangular wave. Switch 21 will preferably be an electronic switch implemented using field effect transistors or the like. The output of the integrator 22 is coupled through a resistor 12b to the inverting input of amplifier 12 which has in its feedback path a resistor 12c. These will be of equal value causing the amplifier 12 to act as a unity gain inverting amplifier. As a result, the triangular voltage output at the terminal 12a of amplifier 12 will be the inverse of that at the terminal 11a. These two output voltages $U_{d1}$ and $U_{d2}$ as noted above, are illustrated on FIG. 9.

FIG. 5 is a schematic drawing of the synchronizing means 13 of FIG. 2. The terminal 10a at which the triple frequency is present is coupled as a triggering input to a monostable multivibrator 23. On each falling edge it forms an output pulse of short duration. These short pulses are inputs to Nand gates 25a and 25b. Nand gate 25a is coupled through a Nand gate 24 acting as an inverter to the terminal 9a at which the clock pulse is present. The clock pulse is also coupled directly to the Nand gate 25b. The outputs of these Nand gates are coupled to a flipflop 26, the Nand gate 25a being coupled to the set input of the flipflop and that of 25b to the reset input. The output pulse on the monostable is one which goes from a logical 1 or a positive level to zero. Thus when a clock pulse appears on a terminal 9a at a logical 1 level it is inverted through the gate 24 and appears as a 0, at one input to the Nand gate 25. On the next falling edge of the triple frequency pulse train the monostable is triggered causing its output to go from logical 1 to logical 0. The output of gate 25a now changes to a logical 1 for the duration of that pulse and sets the flipflop 26. The output of the flipflop 26 at termninal 13a is an enabling signal for the modulator 17 and the gating circuit 18. Once the clock pulse terminates, the direct input to gate 25b will be at a 0 level and on the next falling edge of a triple frequency pulse the output of the monostable multivibrator will cause the output of a gate 25b to become a logical 1 and reset the flipflop 26. Thus, as illustrated by FIG. 9, the output on the terminal 13a will be present essentially for the duration of the clock pulse $\mu_p$.

FIG. 6 illustrates the additional integrating unit 14 of FIG. 2. This forms the reference voltage $U_{ref}$. Included is an electronic switch 27 e.g. an FET switch, having a control input at terminal 39a. As can be seen from FIG. 2 this terminal is an output from the gating circuit 18. The switch selectively couples one of two inputs designated P1 and P2 through respective resistors 28c and 28d to an integrator 28 formed by an operational amplifier 28a with a capacitor 28b in its feedback path. Depending on the position of the switch 39a there is fed to the amplifier either a first potential P1 of predetermined polarity or a second potential P2 of opposite polarity. With reference to FIG. 9 it is noted that the potential P1 is selected so as to cause the output of the integrator to decrease linearly whereas as the potential of the P2 of opposite polarity is selected so as to drive the voltage at the output 14a of the integrator into saturation.

Figure 7:
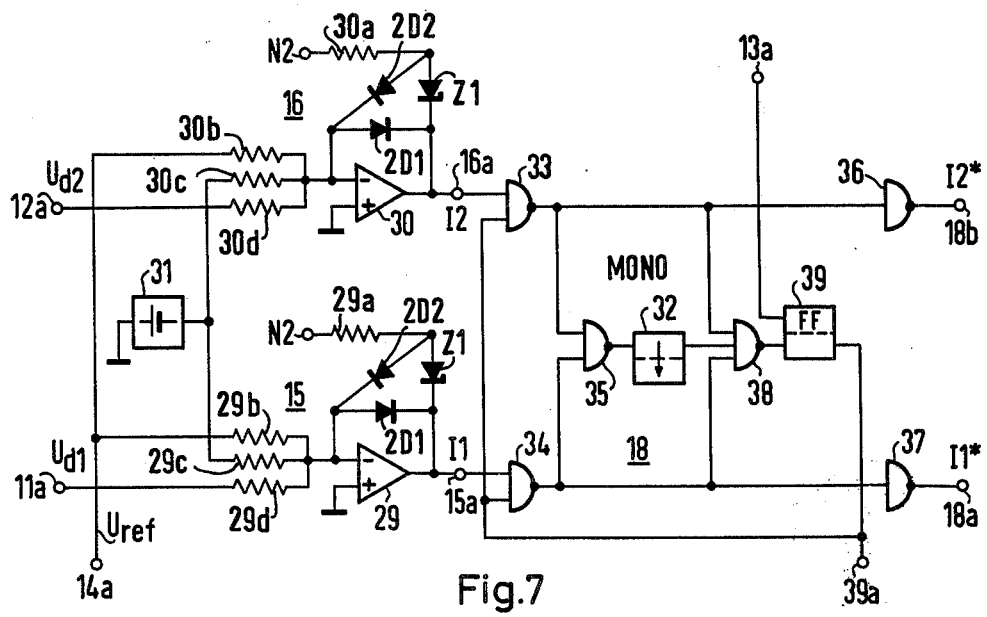
FIG. 7 is a circuit diagram illustrating the arrangement of the comparators of FIG. 2.

FIG. 7 illustrates the basic design of the comparator arrangement of the present invention. Also shown on this figure is the construction of the gating circuit 18 following the comparators. The comparators included as their basic components operational amplifiers 29 and 30, respectively. These comparators have in their feedback pass an arragement of diodes d1 and d2 and zener diodes z1. Coupled to the junction of the diodes d2 and z1 through an appropriate resistor 30a or 29a is a negative potential designated N2. Both comparators have as one input, through resistors 30b and 29b respectively, the reference voltage $U_{ref}$ from terminal 14a. In addition, each has as an input through respective resistors 30c and 29c a fixed potential from a voltage source 31, preferably an adjustable source. Finally, the comparator 16 has an input through resistor 30d to its amplifier 30 to the voltage $U_{d2}$ from terminal 12a. The comparator 15 has the voltage $U_{d1}$ coupled through resistor 29d. Thus, at each of the respective inputs there will be formed a sum of the three input voltages. The result at the output terminals 15a and 16a will be the pulses 11 and 12, respectively shown on FIG. 9.

The gating circuit couples these pulses through as control pulses I1* and I12* to the terminals 18b and 18a which provide the inputs to the modulator as long as the pulse duration of the pulses do not fall below a predetermined minimum duration. Included in the circuit 18 is a monostable multi-vibrator 32 obtaining its triggering input from a NAND gate 35. NAND gate 35 obtains its input from the NAND gate 33 and 34 which have as their first input respectively the outputs at terminals 16a and 15a. The second input of these NAND gates is obtained from the output of a flip-flop 39a which provides the output to terminal 39a mentioned above. The outputs of the two NAND gates 33 and 34 along with the output of the monostable multivibrator 33 are provided as inputs to a NAND gate 38. NAND gate 38 is coupled to the reset input to the flip-flop 39. Initially, upon the occurrence of the pulse output at the terminal 13a, the flip-flop 39 will be set. Thus, there will be a logical 1 voltage on the terminal 39a which is fed as one input to the NAND gates 33 and 34. When a pulse appears at a logical 1 level at either of the other terminals of either NAND gate the output of that NAND gate will go from a logical 1 to a logical 0. Prior to this the NAND gate 35 had two logical 1 inputs and was providing a logical 0 output. Now in response to an output from either gate 33 or 34 it will change to a logical 1 level and trigger the monostable multi-vibrator 32. The output of the monostable 32 is normally at a logical 1 level and in response to triggering will go to 0 level for predetermined time which preferably can be adjusted in conventional fashion. This time is the minimum pulse length which is desired. It will be noted that the pulses I1* and I2* shown on FIG. 9 are obtained by inverting, through the NAND gates 36 and 37, the outputs of the NAND gates 33 and 34. Thus, the pulses appearing at the input to the NAND gate 38 will be the inverse of what is shown on the Figure. Note that between the respective two last pulses on the pulse trains I1* and I2* there is a gap where there is no overlap. At the gate 38, this means that during this period the respective inputs from gates 33 and 34 would be a logical 1. If the time set in the monostable multi-vibrator is less than that gap, when it returns to its normal state of logical 1 there will be three 1's at the input to the NAND gate 38 and its output will change to a zero. This transition forms a logical 1 to a 0 at its output is used to reset the flip-flop 39. Thus, it is possible by properly setting the time of the monostable 32 to reset the flip-flop 39a the output of which, at terminal 30a, is used to disable the NAND gates 33 and 34 to prevent further pulses from entering the modulator. This signal is also used to control the second integrator causing it to integrate upward toward its saturation. This then makes the system ready for the next starting control process.

The modulator 17 is illustrated on FIG. 8. It is made up completely of interconnected NAND gates designated 17a through 17w. Inputs to the modulator include te audio frequency pulses $\mu_R$, $\mu_S$, and $\mu_T$ provided at the terminals 9r, 9s and 9t. As indicated these are initially inverted through NAND gates 17a through 17c. These inputs are also used directly. In addition, the inputs I1* and I2* from the terminals 18a and 18b are used along with the input at terminal 13a, i.e. the clock pulse as modified in the synchronization unit 13. Working backwards, it can be seen that the input on 13a is an enabling input so as to allow the audio frequency outputs to appear only during the time of a synchronization pulse. In the remainder of the circuit, combinations of the various audio frequency pulses are modulated in the gates 17d, e, f and g, 17k, l, m, and n and 17r, s, t and u by the inputs I1* and I2*. The outputs of these gates are then combined in the gates 17h and i, 17o and p and p and 17v and x with the outputs of the gates 17i and 17p and 17v provided to the gates 17j, 17q and 17w which provide the final outputs $\mu R^*$, $\mu_s^*$ and $\mu_T^*$. These pulses are then provided to the inverter 1 in the manner described above.

The operation of the starting control can best be understood with reference to FIG. 9. As shown, the starting point is the audio frequency pulses which are generated as three phase pulses at a given frequency and are present at the terminals 9r, 9s and 9t as the signals $\mu_R$, $\mu_S$ and $\mu_T$ As indicated above, these are combined to generate the pulse train having a frequency three times the audio frequency. This pulse train is then used to generate two triangular waves $U_{d1}$ and $U_{d2}$.

At the beginning of a clock pulse $\mu_p$ at the terminal 9a of the remote control unit 9 operation of the starting unit 8 begins. The clock pulse $\mu_p$ and the triple frequency pulse train are used in the synchronizing means 13 to form, at its output terminal 13a, an enabling signal for the modulator 17. In addition, this enabling signal begins operation of the second intergrator 14 causing its output to gradually decay. In other words, the reference voltage output at terminal 14a decreases linearly with time. In the comparators 15 and 16, the reference voltage and the triangular voltages are compared and used to form pulses from the superimposition of these two wave forms. The manner in which pulses which are increasingly short occur can be seen. These pulses, which, after transmission become the pulses I1* and I2*, are clearly shown on the figure. The purpose of the gating circuit 18 through which these pulses are fed to the modulator 17 is to cut off modulation once the pulses decreases in width below a predetermined minimum time. At that time, a disabling pulse is provided at the terminal 39a which disables the gating unit and at the same time causes the integrator 14 to integrate upward to saturation. After this point, no modulation takes place in the modulator 17, the pulses $\mu_R$, $\mu_S$ and $\mu_T$ being fed directly through to convertor. The integrator and the rest of the system become ready for the next starting process. The result of modulation, as shown by the bottom curves on FIG. 9 is a waveform with an arms value which gradually increases from a small value to its normal value. In other words, there are shown short pulses of increasing pulse width. The pulse width increases until the point where the starting control is cut off and the normal audio frequency pulses are transmitted. The result across two phases is shown by the last curve. Here the effect becomes particularly evident in that it can be seen that there are really small pulses at the beginning which gradually increase in width until the starting control is cut off. The short pulses are filtered out in the filter circuit so that a wave with the proper frequency but with an amplitude which starts out small and gradually increases to its normal amplitude will appear. As a result, there is no large current inrush at the beginning of start up.

As an alternative to terminating modulation of the audio frequency pulses by monitoring the pulse width of the control pulses relative to a minimum duration as shown in connection with FIG. 7, it is also possible to terminate modulation after a predetermined set time. In other words, in the above-described embodiment if the pulse width falls below minimum duration the control pulses for modulation are blocked. Rather than doing this the duration over which modulation is to take place starting with the beginning of the clock pulse can be accomplished through suitable adjustment of the slope of the reference voltage $U_{ref}$ Another possibility is to stop control pulses after a predetermined period of time which can be determined by experiment. This may be done and implemented in a simple manner using a time delay means e.g. a monostable multi-vibrator with an adjustable delay with the stage fired by the enabling signal at 13a. Such a device would at the end of its delay timed disable the control pulses. These and other modifications may be made without departing from the spirit of the invention to be limited solely by the appended claims.

What is claimed is:

1. A method of operating an audio frequency power line carrier control system which utilizes an inverter as the audio frequency power line carrier control transmitter with the output phase voltages of the transmitter fed to a distribution network through series inductances, filter circuits and current transformers, the inverter being controlled by a remote unit which generates audio frequency pulses and clock pulses, the audio frequency pulses being transmitted for the duration of each clock pulse, comprising modulating the audio frequency pulses at the beginning of a clock pulse with synchronized, pulse width modulated control pulses.

2. The method according to claim 1 and further including the step of terminating said modulation a predetermined time after the beginning of a clock pulse.

3. The method according to claim 1 and further including the step of terminating modulation of the audio frequency pulses when the pulse width of a control pulse falls below a minimum predetermined period.

4. Apparatus according to claim 1 wherein said means for generating said control pulses comprise:
   1. first generating means for forming two symmetrical triangular voltages having opposite phases and a frequency three times the audio frequency, said triangular voltages being synchronized with the audio frequency pulses;
   2. second generating means for forming a reference voltage which changes linearly with respect to time; and
   3. first and second comparators, each having as one input said reference voltage and as a second input one of said symmetrical triangular voltages, for forming control pulses through a comparison of a triangular voltage with said reference voltage.

5. Apparatus according to claim 4 further including a gating circuit between said comparators and said modulator for blocking control pulses when the pulse widths thereof fall below a minimum predetermined duration.

6. An audio frequency power line control system comprising:
   a. an inverter for use as the audio frequency power line carrier control transmitter;
   b. a control unit for controlling the inverter;
   c. series inductances, filter circuits and current transformer coupling the output phase voltages of said inverter to a distribution network;
   d. a remote control unit for generating basic audio frequency pulses and clock pulses, the clock defining the time periods over which audio frequency pulses are transmitted; and e. a starting control unit coupling the output of said remote control unit to the inverter said starting control unit comprising a modulator having as signal inputs the basic audio frequency pulses from said remote control unit and having means providing, as modulation inputs, control pulses during a start-up period starting from the beginning of every clock pulse, said control pulses being synchronized with the basic audio frequency pulses and being pulse-width modulated, said modulator having its signal outputs coupled to the control unit and providing thereon modulated audio frequency pulses which will cause the inverter output voltage to have a RMS value starting out small and gradually increasing during said start-up period.

7. A method of operating an audio frequency power line carrier control system which utilizes an inverter as the audio frequency power line carrier control transmitter with the output phase voltages of the transmitter fed to a distribution network through series inductances, filter circuits and current transformers, the inverter being controlled by a remote unit which generates audio frequency pulses, by steps comprising:

a. forming two symmetrical triangular voltages having opposite phases and a frequency three times the audio frequency, said triangular voltages synchronized with the audio frequency pulses;

b. forming a reference voltage which changes linearly with respect to time;

c. forming first and second control pulse trains by comparing respectively said reference voltage and said two symmetrical triangular voltages; and d. modulating the audio frequency pulses output from the remote control unit with said first and second pulse trains and coupling said modulated audio frequency pulses to the inverter to control said inverter.

* * * * *